United States Patent [19]
Mito

[11] Patent Number: 5,361,260
[45] Date of Patent: Nov. 1, 1994

[54] COMMUNICATION SYSTEM
[75] Inventor: Jun-ichi Mito, Aichi, Japan
[73] Assignee: Mitsubishi Denki Kabushiki Kaisha, Tokyo, Japan
[21] Appl. No.: 855,660
[22] Filed: Mar. 23, 1992
[30] Foreign Application Priority Data Mar. 22, 1991 [JP] Japan .................................. 3-059000

[51] Int. Cl.$^5$ .................................................. H04J 3/02
[52] U.S. Cl. .................... 370/85.1; 370/85.15; 370/100.1; 370/103; 370/105.2; 370/108; 318/41
[58] Field of Search ................ 370/85.1, 85.15, 100.1, 370/103, 105, 105.1, 106, 108, 105.2; 318/41

[56] References Cited
U.S. PATENT DOCUMENTS

| | | | |
|---|---|---|---|
| 3,919,484 | 11/1975 | Maxemchuk | 370/100.1 X |
| 4,596,025 | 6/1986 | Satoh | 370/100.1 X |
| 4,727,359 | 2/1988 | Yuchi et al. | 340/518 |
| 4,727,539 | 2/1988 | Arita et al. | 370/85.15 X |

FOREIGN PATENT DOCUMENTS

| | | | |
|---|---|---|---|
| 0068977 | 1/1983 | European Pat. Off. | H04L 25/48 |
| 0196094 | 10/1986 | European Pat. Off. | H04Q 9/14 |
| 9009068 | 8/1990 | European Pat. Off. | H04L 12/40 |
| 58-213546 | 3/1984 | Japan | H04L 11/00 |
| 2043831 | 4/1990 | Japan | H04B 10/20 |

Primary Examiner—Douglas W. Olms
Assistant Examiner—Russell W. Blum
Attorney, Agent, or Firm—Sughrue, Mion, Zinn, Macpeak & Seas

[57] ABSTRACT

A communication system comprising a master station and a plurality of slave stations connected for serial transmission by a transmission line, using a HDLC-type protocol. Each of the slave stations is equipped with a system counter and a control timing setting register. Each slave station receives data when address information included in a transmission frame sent by the master station matches its own address and presets the system counter so that control timing for the object to be controlled by the master station matches the timing by the one or more slave stations. As a result, plural slave stations can output a control signal which matches the control timing for an object to be controlled by master station when the contents of the system counter match the contents of control timing setting register. The predetermined value may be preset and may be based on a collection of actual control timing data between the master station and each slave station.

26 Claims, 12 Drawing Sheets

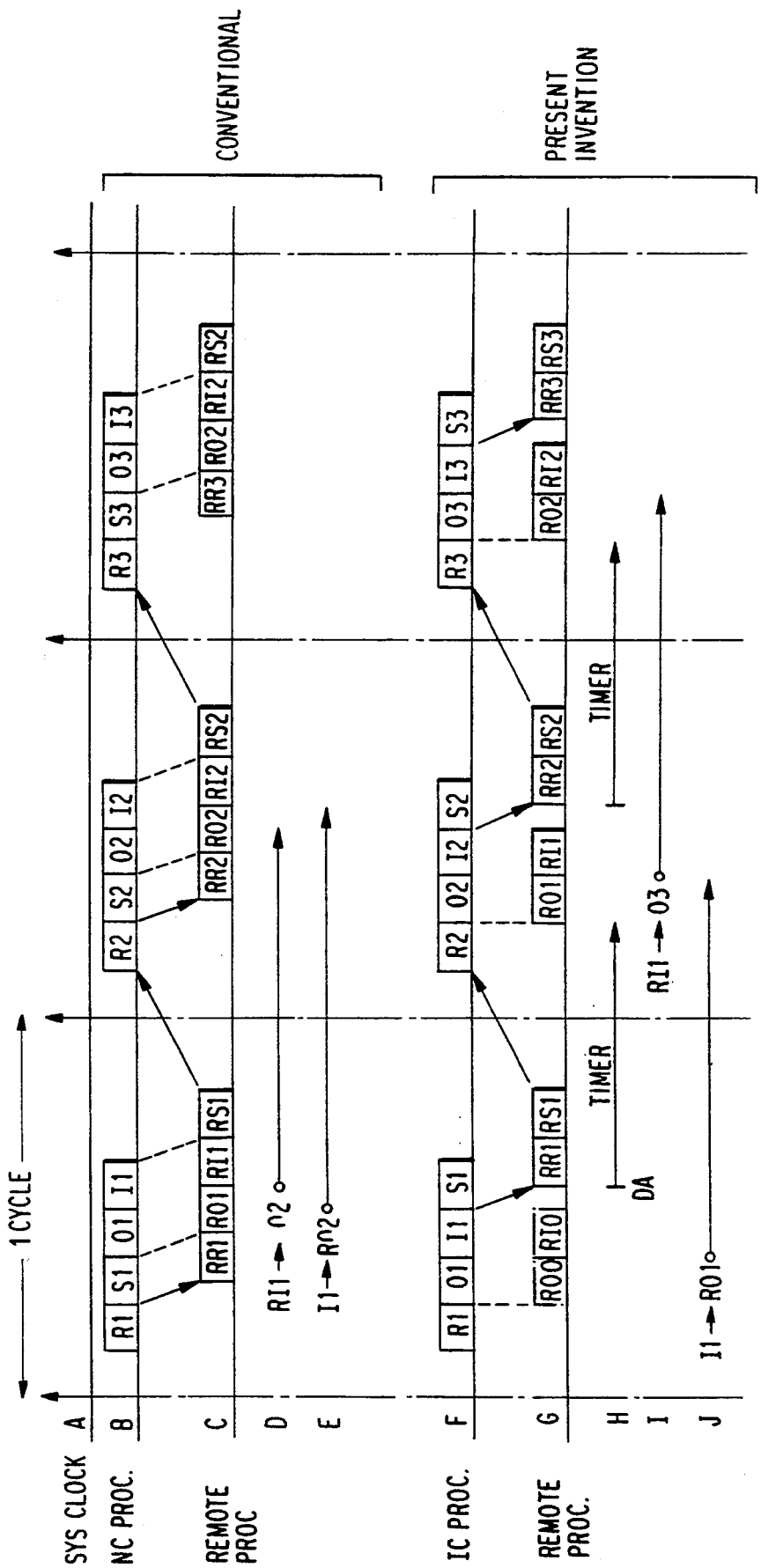

COMMUNICATION SYSTEM

BACKGROUND OF THE INVENTION

1. Field of the Invention

The present invention relates to a communication system for use with a numerical controller or the like for data transfer, via a serial transmission line, between the numerical controller and one or more servo amplifiers/spindle amplifiers for servo motors in an object to be controlled, such as a drive mechanism for a machine tool.

2. Description of the Conventional Art

FIG. 11 illustrates a numerical controller hardware configuration (hereinafter referred to as the "topology") based on a serial real-time communication system (hereinafter referred to as the "SERCOS") between a numerical control mechanism and a drive mechanism for machine tools. The system has been adopted by the German Machine Tool Manufactures' Association (Vereins Deutscher Werkzeugmaschinenfabriken e.v.) and the Central Electrical and Electronic Industries' Society (Zentralverband Elektrotechnik- und Electronikindustrie e.V.).

In the SERCOS system, one or more master (M) stations 1 are installed in a numerical controller for making serial transmission to and from servo amplifiers, spindle amplifiers, etc. of a manufacturing machine. One or more slave (S) stations 2 are linked with the numerical controller by serial transmission and correspond to the control sections of the servo amplifiers and spindle amplifiers in the machine.

One or more drives (D) may be driven from the control sections of the slave stations 2 and specifically correspond to the power sections of the servo amplifiers/spindle amplifiers in the machine. A serial transmission line 4 connects the master station 1 to one or more of slave stations 2, and the arrow indicates the direction in which serial transmission data is transmitted. With reference to the serial transmission link 4, the master stations 1 are on the "numerical controller (N/C) unit side" while the slave stations 2 are on the "remote control unit side".

As shown in FIG. 11, the SERCOS embodies a topology wherein a plurality of master stations 1 may be contained in a numerical control mechanism, and each master station may have a respective plurality of slave stations 2 interfacing with a corresponding one or more drive controllers 3, and may be linked to its respective slave stations in a ring-form by serial transmission line 4.

The particular specifications of the serial transmission line 4 in the SERCOS may be described with reference to FIGS. 12 to 16.

First, with respect to signal format, serial transmission between a master station 1 and its corresponding slave stations 2 employs a format similar to the High Level Data Link Control (HDLC) protocol (frame configuration. . .JIS X5104) as shogun in FIG. 12. The format comprises a start FLAG, serving as a first multibit frame delimiter, an address field comprising a destination address DA and a source address SA, a data field D, a frame check field FCS and an end FLAG. A FLAG may comprise 8 bits, such as the sequence 0111 1110 representing the nun%her "7E" in hexadecimal. The address fields DA and SA each may comprise eight bits and the data field D may comprise a plurality of eight bit groupings. The frame check sequence field FCS is fixed at 16 bits. The conventional HDLC protocol may be consulted for more information on the frame configuration and, therefore, will be omitted herein.

Second, with respect to transmission timing, it should be noted initially that the serial transmission line 4 may comprise an optical fiber transmission path, as shown in FIG. 15. The optical fiber cable is interfaced to transmission equipment by connectors conforming to the SMA standard (IEC86B(C020)). In FIG. 15, a TTL signal is input to a transmission end comprising a driver circuit 20, which controls the operation of an LED within an SMA housing 21. The light output of the diode is directed by an SMA connector 22 to a plastic optical fiber 23. At the receiving end, a similar connector 22 directs the light signals to a photodiode with an amplifier integrated circuit contained in an SMA housing 24. The transmitted signal is thus converted from optical to TTL for subsequent processing at the receive end.

Since only one optical fiber transmission path is employed in a ring foden, a transmission clock and transmission data are multiplexed for transmission and then separated and extracted from the sent signal on the receive end. NRZI (No Return to Zero Inverted) coding shown in FIG. 14 is employed to create this signal by multiplexing the transmission clock and transmission data. Downward arrows in FIG. 14 indicate the change points of the transmission clock. An example of the NRZI coding achieved by combining the bottom transmission data of 0 and 1 and the top transmission clock is given as a waveforth shown in the middle, which is inverted in accordance with the timing of the transmission clock sending data "0".

The receive end extracts the transmission clock based on the timing of the wavefoden inversion, samples the wavefoden in accordance with the timing of the transmission clock extracted, and determines the values of 0 and 1 for the transmission data.

FIG. 13 illustrates a time allocation of the data transmitted through the transmission line, wherein MST indicates transmission timing data from the master station 1 to the slave stations 2, wherein AT1, AT2 to ATX indicates transmission data from the slave stations 2 to the master station 1, and MDT indicates transmission data from the master station 1 to the slave stations 2.

For specific data, a transmission cycle (TCYC, e.g. 1.7 ms) is determined in accordance with the MST timing. The MST is a frame including system modes (start-up, operation and other modes), etc. and chiefly functions to establish synchronization with the slave stations. The AT1, AT2, ATX are frames transmitted from the slave stations to the master station a specified period of time (T1.1, T1.2 to T1.X) after the transmission of the MST; such frames include motor position data, motor speed data, motor current data, alarm status, etc. of the servo amplifiers and spindle amplifiers serving as the slave stations.

The MDT frame transmitted by the master station, at a time T2 after the transmission of the MST frame, includes data such as motor drive commands to the servo amplifiers and spindle amplifiers and mode designation (constant surface-speed control mode, C-axis control mode, etc.) to the servo amplifiers and spindle amplifiers.

As described above, the communication between the master station 1 and the slave stations 2 during the TCYC cycle permits the functions of the numerical controller to be achieved.

FIG. 16 is a general connection block diagram where two slave stations are connected to one master station. In FIG. 16, the master controller 1 represents the master station, and the slave controller 2A and slave controller 2B represents the slave stations #1 and #2, respectively. A clock 30 is operative to generate a clock signal TXCLK which is input to the master station controller and to a flip flop 31. The master station controller outputs a data signal TXD and a transmission switching signal IDLE which, together with the flip flop 31 output signal, are received by multiplexer 32. The multiplexer 32 is a transmission signal switching circuit where either of two input signals is selected, thereby generating the NRZI signal for transmission to the several slave stations. The NRZI signal in TTL form is provided to the transmission end 33 which converts the electrical signal to an optical signal for transmission along optical link 34A.

At a first receive end 35, a conversion is made from an optical signal into an electrical signal. The output of the receive end is connected to a receive signal regeneration section 36 for separating the received NRZI signal into receive data RXD and receive clock RCLK, which are then provided to the controller 2A for slave #1. The receive clock and data are processed by the controller 2A for slave #1 and the controller is operated accordingly.

The receive clock RCLK also serves as a transmit clock and is processed by the slave #1 controller in a manner similar to the way that the signal TXCLK is processed by master controller 1. In addition to the slave #1 controller, the receive data RXD also is provided to a multiplexer 37, which generates NRZI signals in further response to a transmit data TXD and switching signal IDLE from the controller 2A of slave #1. Transmit end circuit 38 functions in a manner similar to circuit 33. Also, the comparable elements 39–42 for slave #2 and the receive elements 43, 44 for master station 1 function in a manner corresponding to similar elements 35 and 36 in slave #1. The connection of the stations by lines 34A–34C defines a ring topology.

A first problem to be solved in the conventional communication system, configured as described above, is that synchronization must be established in accordance with the master synchronization frame MST transmitted by the master station to the slave stations in order to ensure exact synchronization of the master station and the slave stations connected to the master station. The use of the dedicated master synchronization frame MST to establish synchronization, results in low transmission efficiency.

The maintenance of synchronization is extremely important and in most applications cannot be compromised. For example, where the master station is a numerical controller that allows synchronous control of a plurality of axes (e.g. X, Y and Z axes) and the slave stations are servo amplifiers and/or spindle amplifiers, lack of synchronization of the master and slave stations causes the axes driven from the servo amplifiers to move separately on a time basis or the axis driven from the servo amplifiers and the spindles driven from the spindle amplifiers to operate individually on a time basis. As a result, the intended machining would not be accomplished accurately.

The synchronization problem explained with respect to the simple system of FIG. 16 is further amplified in a more complex system, such as one with multiple remote stations. FIG. 17 is a schematic configuration diagram of a conventional numerical control unit which employs sequence processing and has multiple remote units operating under its central command. In the Figure, a numerical control unit 51 comprises a plurality of sections 51A–F and is connected to a plurality of remote control units 52 via serial transmission line 54A operating in accordance with the HDLC protocol. An operator control station 53 comprises a communication interface 53A that is connected to section 51E of the numerical control unit 51, an operation board 53B (and/or keyboard) for an operator to carry out control, and a display section 53C. From section 51C, the N/C unit can have direct control of operational machining elements, such as servo amplifiers 55 and spindle amplifiers 56, which operate servo motors 57 and spindle motors 58, respectively. Because the I/O slots for the printed circuit boards in an NC device are limited, an external or remote device having an I/O and CPU may be connected to provide control for additional motors. Thus, from section 51B, the N/C unit can have indirect control of additional operational machining elements via the remote control units 52. In that case, a machine I/O section 51A of the numerical control unit 51 and a machine interface 59, which also connects to the machine I/O sections 52A of each remote control unit 52, also are connected via lines 54B and 54C.

In operation, a sequence program for executing the machine sequence of a machine tool used with the numerical control unit 51 is included in the numerical control unit 51 for the execution of machine sequence processing. Results of the sequence-processing by the numerical control unit 51 are transmitted under the HDLC protocol via lines 54B to the machining interface 59 for further input to the remote control units 52. Information concerning the operation of the remote unit machining are also transmitted via the interface and lines 54C, and under the HDLC protocol to the numerical control unit 51, which then performs further sequence processing thereon.

Based on this design, a second problem in the conventional art is that the timing of the machine I/O processing in the numerical control unit 51 and the remote control units 52 are not considered in the conventional system of FIG. 17. As a result, timing errors occur between the machine I/O processings of the numerical control unit 51 and the remote control units 52.

A third problem with systems that use a HDLC or similar frame, as seen in FIG. 12, is the existence of transmission errors. If there is a transmission error in the frame check sequence code that is used to detect errors in an address or data, or in an address section or in a data section in the frame, the frame itself will simply become meaningless. However, such errors will not cause any transmission problems. But since there is only one start and one end flag in a HDLC or similar frame, errors typically will originate with those flags.

For example, a noise component, having a short pulse width and a relatively low frequency, called power source noise, (for example, drawing in FIG. 19) may overlap either or both flags in the HDLC frame, as is shown for HDLC frames F1, F2 and F3 in FIG. 18. In this case in FIG. 19, the transmission line noise has a period of 20 msec (50 Hz) and will interfere with the integrity of the transmission. As a result, the frame structure cannot be identified and a significant amount of time will be required to restore transmission to a normal state.

Specifically, if there is a transmission error in start flag at A1 in frame F1 in FIG. 18, the slave station will continue to wait for a start flag since start flag A1 is not detected. Since slave flag A1 is blocked, the end flag at B1 may be mistakenly perceived as the start flag. Even if start flag at A1 is recognized, but if end flag at B1 is not identified due to a transmission error, the start flag at C1 in Flame F2 may be mistakenly identified as an end flag. In addition, if either flag of a standard HDLC transmission frame is not detected due to transmission line noise, etc., it is difficult to restore a transmission cycle.

It is, accordingly, an object of the present invention to overcome the disadvantages in the conventional art by providing a communication system which solves the first problem by allowing synchronization to be established between the master station and the slave stations without employing any special synchronization frame.

It is a further object of the present invention to provide a communication system that can operate more efficiently than the conventional system, and at a higher speed.

It is yet another object of the present invention to provide a communication system in which timing is established on the basis of data transmission by the master station to the slave stations.

Another object of the present invention is to overcome the second problem in the conventional art by matching the I/O timing between the numerical control unit and the machine interface of the machine at the numerical control unit I/O section and the remote control unit I/O sections, thereby improving I/O timing accuracy.

A further object is to solve the third problem in the conventional art and achieve transmission between the numerical control unit and the remote control units which is not affected by data errors due to transmission line noise.

SUMMARY OF THE INVENTION

The present invention achieves these and other objects by establishing respective transmission times for addressed information directed from a master station to a plurality of slave stations, and establishes at each slave station a respective timing value that corresponds to the transmission time for its information, so that each station can establish synchronization of operation on the basis of a detection of the addressed information and the timing value.

More specifically, in accordance with the invention, a plurality of slave stations may be connected with a master station by a serial transmission line. Each of the slave stations is equipped with a system counter and a control timing setting register. Each slave station receives data when address information included in a transmission frame sent by the master station matches its own address and presets the system counter so that control timing for the object to be controlled by the master station matches the timing by the one or more slave stations. As a result, plural slave stations can output a control signal which matches the control timing for an object to be controlled by master station when the contents of the system counter match the contents of control timing setting register.

As yet another feature of the invention, the slave station collects actual control timing data between the master station and the slave station and, based on this data, the slave station sets a predetermined value in the control timing setting register.

As a further feature of the present invention, the information transmitted between a master station and the slave stations comprises plural starting and/or ending flags, the number of flags being selectable on the basis of the desired reliability.

The present invention, as described and claimed, results in a low-cost communication system which allows reference timing in a corresponding slave station to be present when the destination address information in data transmitted from the master station to the slave station matches the slave station's own address so that synchronization of the master station and the slave stations may be established without employing a special clock signal transmission line.

Further, the present invention simplifies the interface of a machine by making machine I/O processings of the numerical control unit with respect to the machine timed almost simultaneously, independently of the machine I/O section built in the numerical control unit and the machine I/O sections built in the remote control units. In the HDLC-type transmission between the numerical control unit and the remote control units, the remote control unit activates a timer synchronized with a destination address existing in a HDLC-type frame transmitted from the numerical control unit, whereby the machine I/O processing of the remote control units can be performed with approximately the same timing as the machine I/O processing of the numerical control unit.

Finally, the present invention provides a high level of reliability in various environments by providing a HDLC-type frame with a plurality of starting and/or ending flags.

BRIEF DESCRIPTION OF THE DRAWINGS

FIG. 8 is a processing timing comparison diagram between an embodiment of the present invention and the background art.

DESCRIPTION OF THE PREFERRED EMBODIMENTS

An embodiment of the present invention will now be described in reference to FIGS. 1 to 5.

Figure 1:
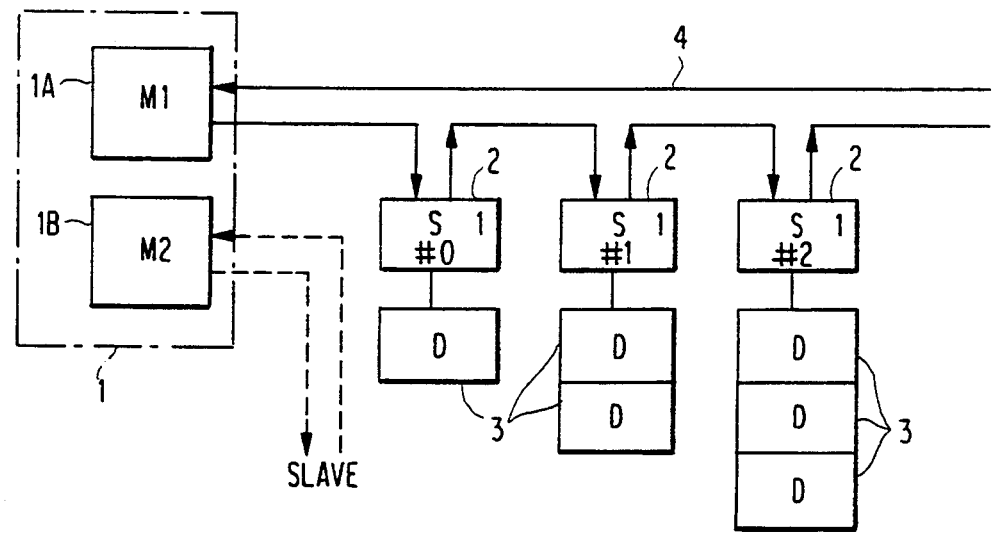
FIG. 1 illustrates a numerical controller system configuration with which the communication system of the present invention is used.

FIG. 1 illustrates a numerical controller system configuration with which a communication system associated with the present invention is used, wherein two master stations 1A and 1B are installed in a numerical controller 1 for making serial data transmission to and from servo amplifiers/spindle amplifiers in an object to be controlled (e.g., a machine). Each master station communicates over a serial link with one or more slave stations 2; for example, slave stations S1 (#0–#2) are linked in a daisy chain connection with the master station 1A by a serial data transmission line 4. Each slave station corresponds to the control section of a servo amplifier/spindle amplifier and is connected to one or more drives 3 that are driven from the control sections of the slave stations 2 and are equivalent to the power sections of the servo amplifiers/spindle amplifiers. The serial data transmission line 4 connects the master station 1A to the plurality of slave stations 2 and provides a serial data transmission in the direction indicated by the arrows.

Figure 2:
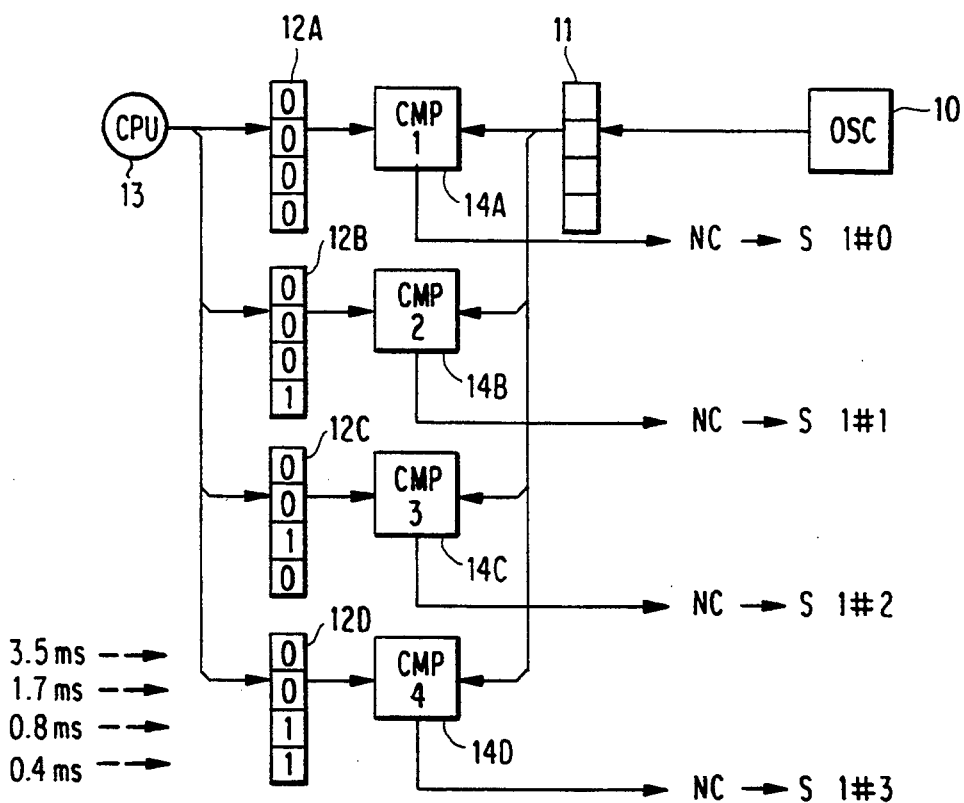
FIG. 2 is a master station configuration according to an embodiment of the present invention.
Figure 6:
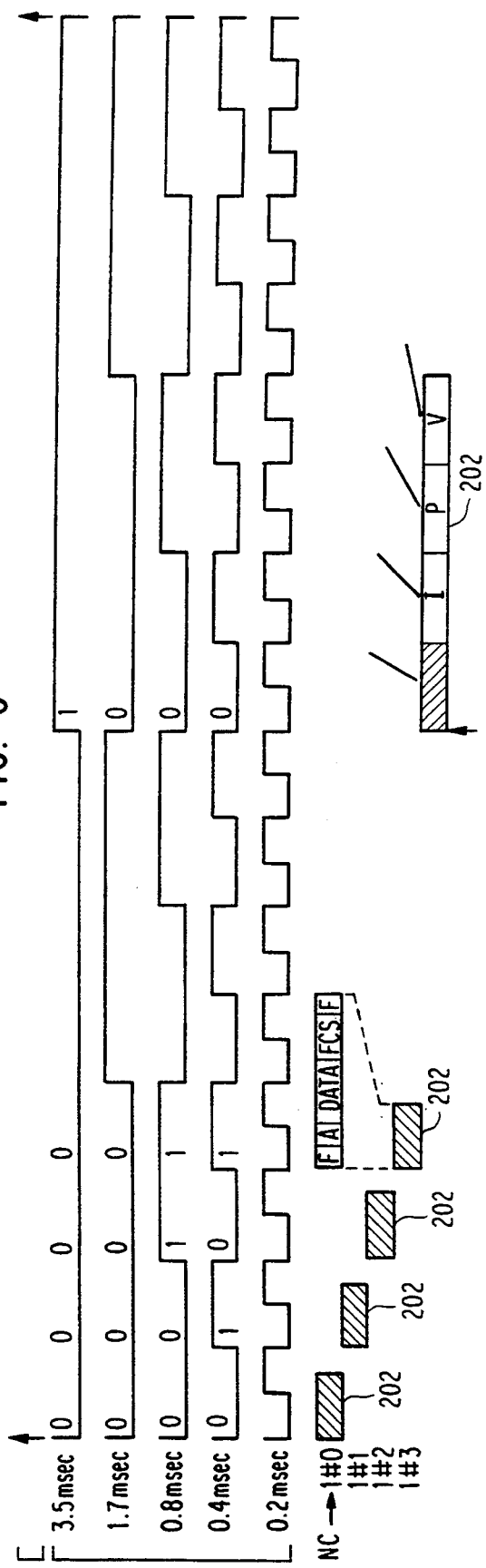
FIG. 6 is a timing chart showing the overall operation of the communication system according to an embodiment of the present invention.

FIG. 2 is a master station configuration diagram for the control of four slave stations via a serial data transmission line. In FIG. 2, an oscillator circuit 10 provides a pulse string to an NC internal system counter 11 which counts the input pulses and generates a plurality of outputs, each defining a different period of time. For example, a pulse string that has a period of 0.2 ms will result in counter outputs at periods of 3.5 msec, 1.7 msec, 0.8 msec, 0.4 msec and 0.2 msec, as shown in FIG. 6. Each of the periods is established by dividing the clock pulses from the oscillator circuit 10 and is used to established the unique timing of transmissions for a respective slave station. Transmission timing setting registers 12A to 12D also are used to establish the transmission timing for each respective slave station 2 and their content is set by a CPU 13. For example, "0000" is set in the register 12A for defining the transmission timing for the slave station 1#0, "0001" is set in the register 12B for defining the transmission timing for the slave station 1#1, "0010" is set in the register 12C for defining the transmission timing for the slave station 1#2, and "0011" is set in the register 12D for defining the transmission timing for the slave station 1#3. At the time of this setting, the transmission timing of the 0.2 msec period is not set in a register because the transmission will be timed properly if that timing is not set.

Comparator 14A to 14D are used for comparing the current value of the NC internal system counter 11 and the value stored in each of the transmission timing setting registers 12A to 12D and for initiating a data transmission to the corresponding slave station 2 when the values match. Specifically, as shown in FIG. 6, when the value of the NC internal system counter 11 is "0000," (i.e. the clock pulse input at a period of 0.2 ms have not yet defined a period of 0.4 ms, 0.8 ms, 1.7 ms or 3.5 ms), it matches the value "0000" of the register 12A and data transmission to the slave station 1#0 is started.

Figure 5:
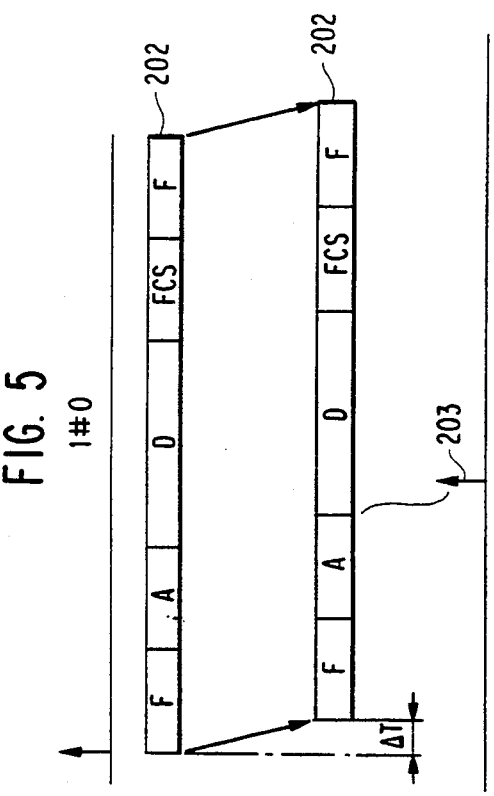
FIG. 5 illustrates detailed data transmission timing between the master station and the slave stations according to an embodiment of the present invention.

When the NC internal system counter 11 value reaches "0001", "0010" and "0011," they match those of the registers 12B to 12D, respectively, and data transmission to the slave stations 1#1 to 1#3 is started in sequence. Each data transmission 202 is formed in a frame configuration conforming to the HDLC standard and is received by the slave station 2 with a delay of T time occurring due to the transmission line 4, as shown in FIG. 5 for slave station 1#0 data.

Figure 3:
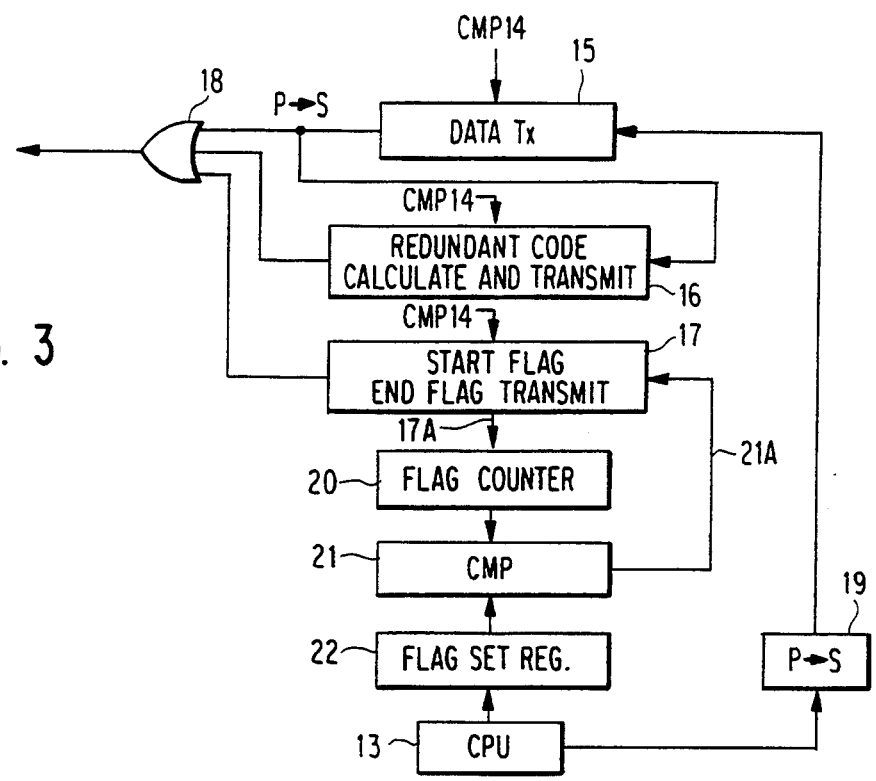
FIG. 3 is a schematic block diagram of an HDLC transmission circuit according to an embodiment of the present invention.

FIG. 3 illustrates an HDLC frame transmission circuit in accordance with the present invention, wherein a data transmission circuit 15 receives the output of a corresponding comparator 14 in the master station and, in response thereto, outputs data received from a parallel to serial converter 19 that converts con, hand and data signals from CPU 13. The output of the transmission circuit 15 is sent concurrently to an OR circuit 18 and to a redundant code calculation and transmission circuit 16. The redundant code circuit 16 is used to add a redundant code (a frame check sequence or FCS) that serves to detect any overall data error that extends over a plurality of bits. The output of the redundant code circuit 16 is also output to OR circuit 18.

A start flag and end flag transmission circuit 17 also receives the timing output of a corresponding comparator 14 in the master station and provides an output to the OR gate 18 which indicates the beginning and end of an HDLC frame. As the flags are sent, the flag transmission circuit 17 also provides a transmission completion signal on line 17A indicating that the transmission of one flag is complete. The transmission completion signal is output to a flag counter 20, which counts the number of start and end flags sent.

In addition to outputting processed data to converter 19, the CPU 13 also outputs a flag number that is used to determine the timing of the data transmission by the master station. A flag number is preset into flag setting register 22 and the register output is provided to comparator 21. When the count of completed flag transmissions in counter 20 equals the preset number in register 22, the comparator 21 issues a transmission stop signal on line 21A for stopping the flag transmission.

Figure 4:
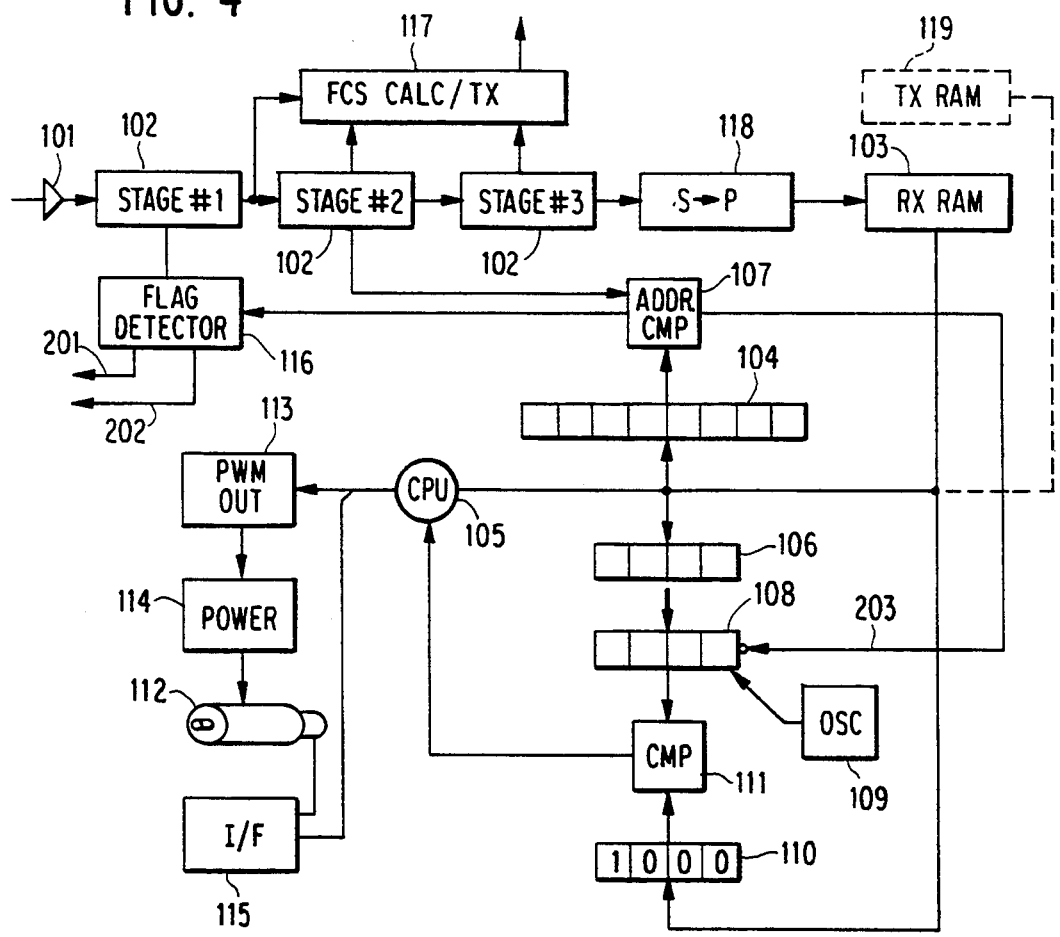
FIG. 4 illustrates a slave station configuration according to an embodiment of the present invention.

Referring now to FIG. 4, a configuration diagram of one slave station 2 is shown. A receiver 101 is connected to the output of the master station or a preceding slave station for receiving data transmitted by the master station 1. The output of receiver 101 is directed to a multi-stage receive shift register 102, having one output that connects to a receive RAM 103 for storing data transmitted by the master station 1 for the receiving slave station. Another output of the register 102 is connected to a comparator 107, in common with the output of a receiver address setting register 104. The receive address setting register 104 has stored therein a unique receive address that is allocated in correspondence with the identity of one respective slave station 2 and is preset by a CPU 105. A system counter presetting register 106 stores the same value as that of a corresponding transmission timing setting register 12A to 12D in the master station 1 and is preset by the CPU 105 with a value that will put that particular slave station 2 in phase with the transmission cycle from the master station 1. Specifically, "0000" is set in the system counter presetting register 106 of the slave station 1#0, "0001" in the system counter presetting register 106 of the slave station 1#1, "0010" in the system counter presetting register 106 of the slave station 1#2, and "0011" in the system counter presetting register 106 of the slave station 1#3.

The comparator 107 acts to compare an address in a frame transmitted by the master station 1 and an address preset in the receive address setting register 104. Upon determination of an identity of addresses, the comparator 107 issues a load signal 203. The load signal is operative for loading the value set in the system counter presetting register 106 into the slave's system counter 108. Thus, upon detection of an identity between unique slave address and transmitted address in the signal send by the master, the system counter load signal 203 will be input to the system counter 108 and will preset the value of the system counter 108.

An oscillator circuit 109, having a clock source which generates pulses at a frequency identical to that of the oscillator circuit 10 in the master station 1, is input to the system counter 108. When gated by the load signal 203, the system counter 108 will count the pulses output by the oscillator 109 and will generate outputs having periods of 3.5 msec, 1.7 msec, 0.8 msec and 0.4 msec. The periods are selected to match the periods of the signals provided by counter 11 in the master station 1. An interrupt timing setting register 110 is preset by the CPU 105 to have an interrupt timing value ("1000" in the present embodiment) that is reached after all slave stations 2 would have received data from the master station 1. The same timing value is set in all slave stations 2 that require synchronous control.

A comparator 111 is connected for comparing the value of the system counter 108 and that of the interrupt timing setting register 110 and for outputting an interrupt signal to the CPU 105 when the values match.

The CPU 105 controls a servo motor 112 (e.g. a spindle motor) through a PWM output circuit 113 and a power circuit 114. The position and other data of the motor 112 are fed back to the CPU 105 by a detector interface 115. Other components are similar to those in the conventional system and will not be described herein.

The operation of the present invention may be best described with reference to FIG. 6, which is a timing chart identifying the overall operation of the present invention. Initially, it should be noted that "0000," "0001," "0010" and "0011" are to be preset by the CPU 13 in the transmission timing setting registers 12A to 12D of the master station 1, respectively. These settings will be used to define the particular timing of each slave station transmission. In addition, the receive addresses allocated in correspondence with the slave stations 2 are preset by each CPU 105 in the receive address register 104 of its respective slave station 2. The same values as those of the transmission timing setting registers 12A to 12D, i.e. "0000," "0001," "0010" and "0011," are also preset by each CPU 105 in the slave station counter preset register 106. Finally, the interrupt timing value ("1000") to the CPU 105 is preset by each CPU 105 in the interrupt timing setting register 110.

In the present example, the transmission to the slave station 2A, 2B, 2C and 2D will be set to occur at 0.4 ms, 0.8 ms, 1.7 ms and 3.5 ms, respectively, as seen in FIG. 6. Further, an interrupt is set to occur at 7.2 ms.

After the predetermined values have been set in the registers 12A to 12D, 104, 106 and 110 as described above, data transmission from the master station 1 to the slave station 2 is started.

The value of the NC internal system counter 11 is then compared with those of the transmission timing setting registers 12A to 12D by the comparators 14A to 14D and data transmission to a corresponding slave station 2 is started when the values match. Since the values "0000" match first, data transmission to the slave station 1#0 is initiated. A predetermined length of time after the start of the transmission to the slave station 1#0, the values "0001" match and the transmission to the slave station 1#1 is started. Since the values "0010" and "0011" then match in sequence, transmissions to the slave station 1#2 and the station 1#3 are initiated in sequence.

Figure 12:
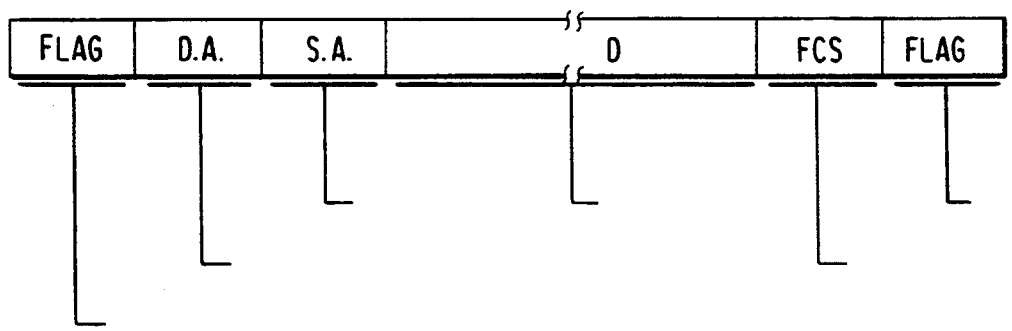
FIG. 12 illustrates a conventional data frame configuration employed for one cycle of serial transmission in the SERCOS.
Figure 13:
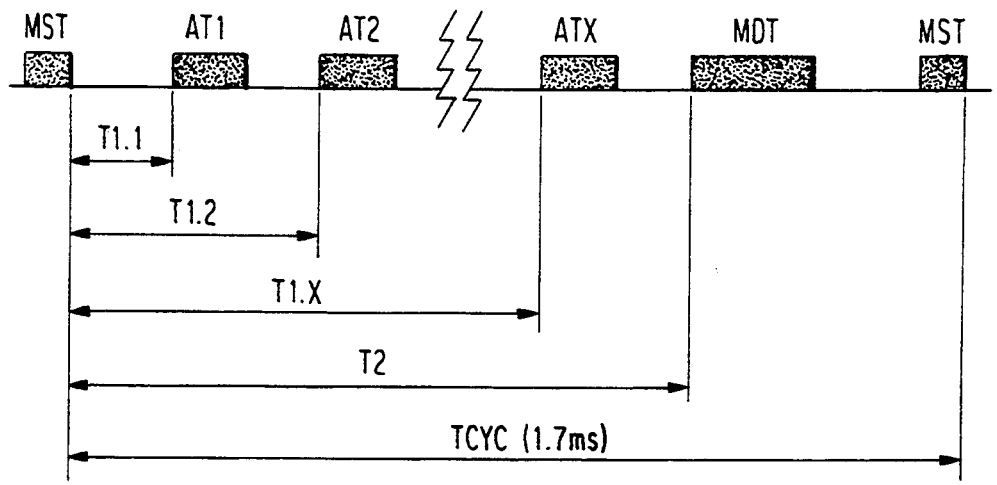
FIG. 13 is a time allocation diagram for a serial transmission line in the SERCOS.
Figure 14:
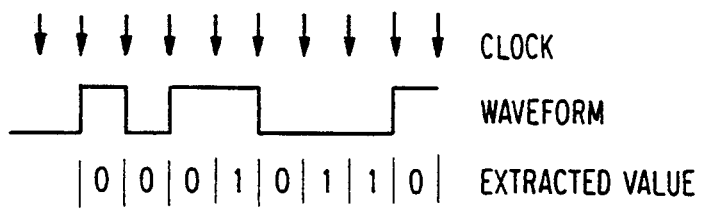
FIG. 14 provides an example of serial transmission data coding in the SERCOS.
Figure 15:
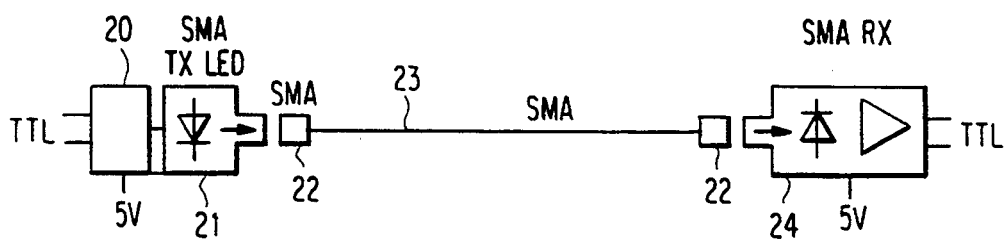
FIG. 15 is a diagram illustrating an optical fiber transmission path used with the serial transmission line in the SERCOS.
Figure 16:
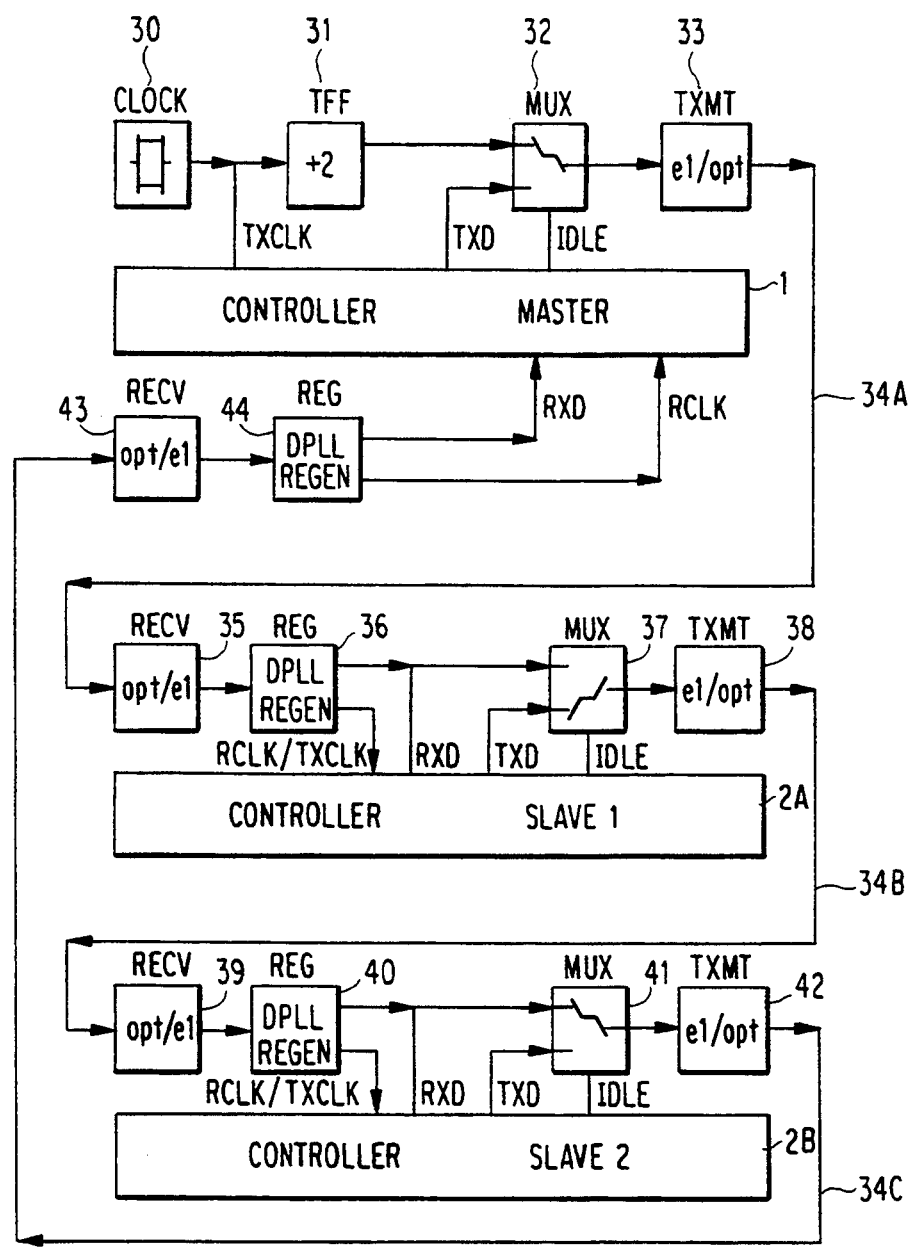
FIG. 16 is a general view of transmission line connection in the SERCOS.

The transmission to the several slave stations appear in respective time slots that are serially ordered, as illustrated in FIG. 6. Each transmission in a time slot may have the conventional data form configuration illustrated in FIG. 12, including slave station address information.

As a result, each slave station 2 receives its data at its receive RAM through the receiver 101 and the receive shift register 102 with a delay ΔT occurring due to the transmission line 4 after the start of transmission as shown in FIG. 5. Since the slave station 1#0 is the first to receive data at the receive RAM 103, the address entering into the receive shift register 102 matches the address set in the receive address setting register 104. This causes the comparator 107 to output the system counter load signal 203 to the system counter 108. When the load signal 203 is input to the system counter 108, "0000" preset in the system counter presetting register 106 is loaded into the system counter 108, which is then set to "0000" and starts to count the clock pulses from the oscillator circuit 109 from "0000".

After the slave station 1#0 has received data and the system counter 108 has started counting from "0000," the slave station 1#1 receives data at the receive RAM 103, "0001" is set in the system counter 108 of the slave station 1#1 in the same manner as in the slave station 1#0 as described above, and the system counter 108 of the slave station 1#1 starts counting the clock signals from the oscillator circuit 109 beginning with "0001." At this time, the value of the slave station 1#0's system counter 108 is identical to that of the slave station 1#1's system counter 108. Since the system counters of the slave stations 1#2 and 1#3 are set to "0010" and "0011," respectively, in the aforementioned manner in sequence, the system counter 108 values of all slave stations 2 are identical to each other on completion of the data transmission to the slave stations 1#0 to 1#3.

When the value of the interrupt timing setting register 110 in each slave station ("1000" in the present embodiment) matches that of the system counter 108, with the system counters 108 of all slave stations 2 being in phase with each other as described above, each comparator 111 concurrently outputs an interrupt signal to its corresponding CPU 105.

When such interrupt signal is input to each CPU 105, each CPU 105 simultaneously reads the control data (current loop processing, position loop processing and speed loop processing data in the present embodiment) for each motor 112, as stored on each receive RAM 103 of each slave station 2, and synchronously controls each motor 112 through each PWM output circuit 113 and each power circuit 114.

In the operation of the first embodiment of the present invention described above, the slave stations 2 can be synchronized without transmitting the synchronization frame required in the conventional system. In other words, the motors 112 can be synchronously interpolated without transmitting any synchronization frame. This permits the intended machining, where synchronous interpolation is required, to be achieved.

In a further feature of the first embodiment, where the system counters 108 are preset by the slave stations on detection of their own addresses, they may be designed to be preset again only a predetermined period of time (e.g., one transmission cycle time) after being preset once. In this design, if a wrong address is transmitted due to noise entering the transmission line or if the comparator 107 misoperates and misrecognizes a station address, the communication system of the present invention will operate without fault and its reliability will be further improved.

While the oscillator circuits 10 and 109 each have a clock source with identical frequencies in the preferred embodiment, it would be clear to one of ordinary skill that the clock sources need not be of identical frequencies.

Referring again to the illustration in FIG. 4 of an HDLC frame receive circuit according to the present invention, a flag detector circuit 116 is operative to detect the start and end of the HDLC frame in response to the results of the comparisons made by comparator 107 and to output a receive start signal 201 and a receive end signal 202. An FCS calculation and comparison circuit 117 receives the signals stored in each stage of the shift register 102 and detects an error occurrence by calculating the FCS of receive data, comparing the FCS data transmitted following the receive data, and outputting an FCS error signal 203 if the result of comparison is a mismatch. A converter circuit 118 is connected at the output of the last stage of register 102 for converting the received serial data into parallel data.

The combination of 104, 106 and 107 acts as a destination address detector circuit for starting an HDLC receive operation upon detecting a destination address match. The circuit also outputs a preset signal 203 to timer counter 108, operating in accordance with a system clock 109, for causing a predetermined timed delay, which is a major feature of the present invention.

As previously described, comparator 111 will output a match signal 205 when the value preset in timer time setting register 110 matches a value of the timer counter 108. This match signal 205 is employed as an interrupt input into the CPU 105. In response thereto, the CPU 105 outputs the contents of the receive RAM 103 into a remote control unit machine I/O section comprising elements 112–115 and writes data incoming from the machine I/O section into a transmit RAM 119.

Figure 9:
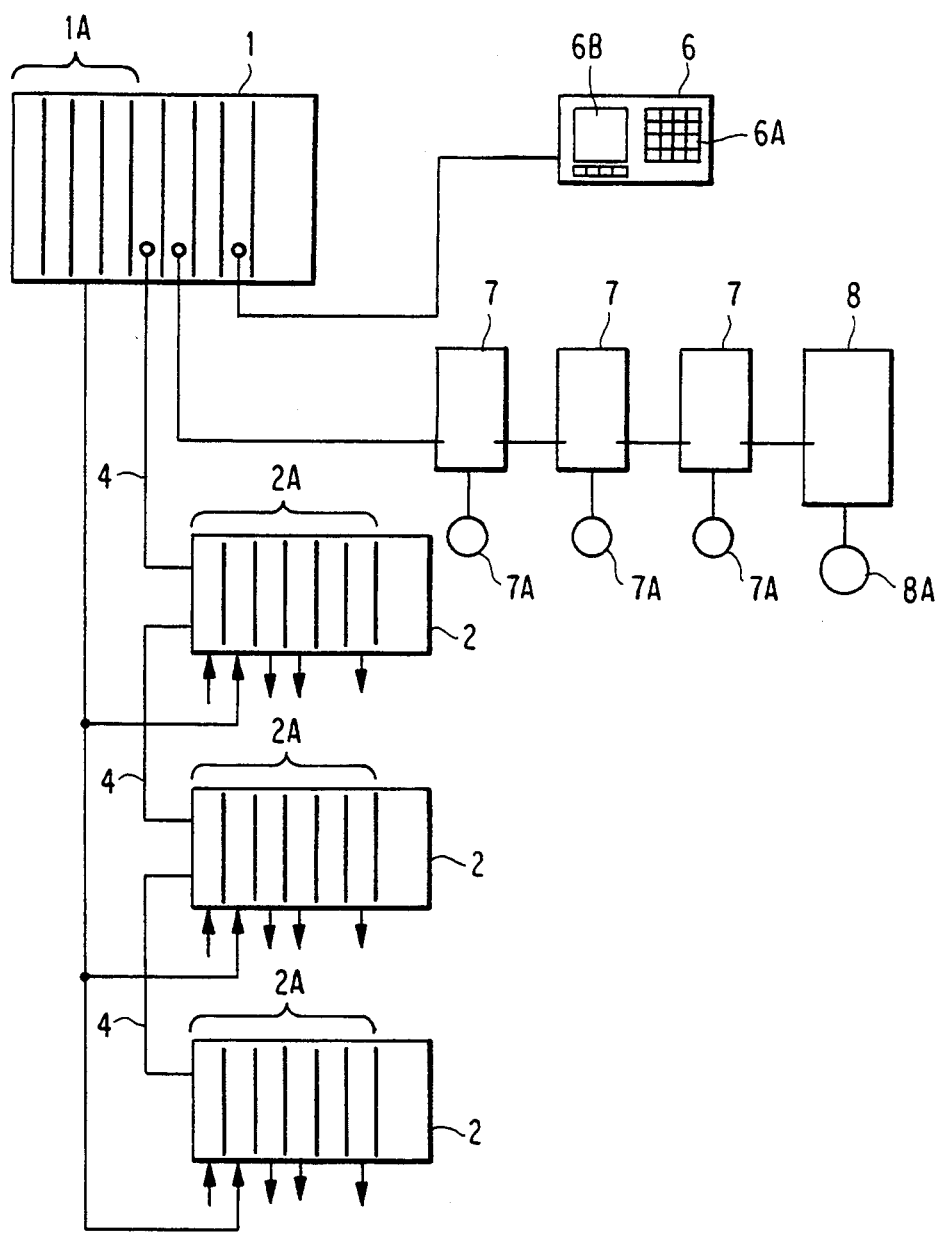
FIG. 9 illustrates a N/C system which can automatically determine machine I/O timing according to an embodiment of the present invention.
Figure 17:
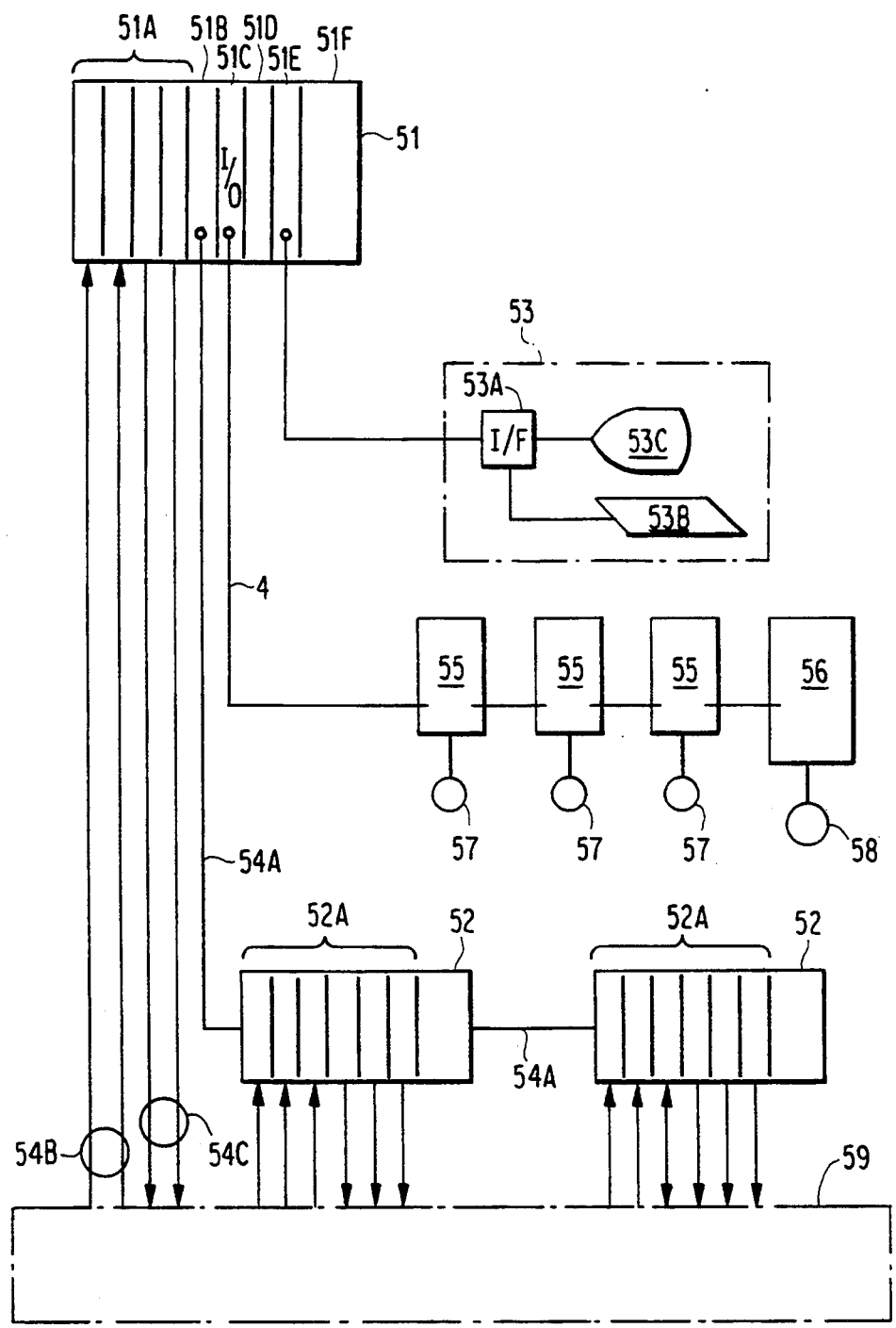
FIG. 17 is a schematic block diagram of a conventional control unit.
Figure 18:
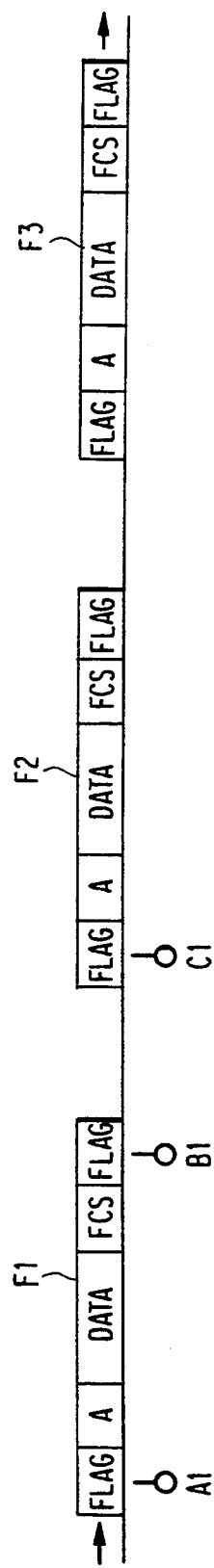
FIG. 18 is a timing diagram for a continuous data frame timing art in the conventional transmission.
Figure 19:
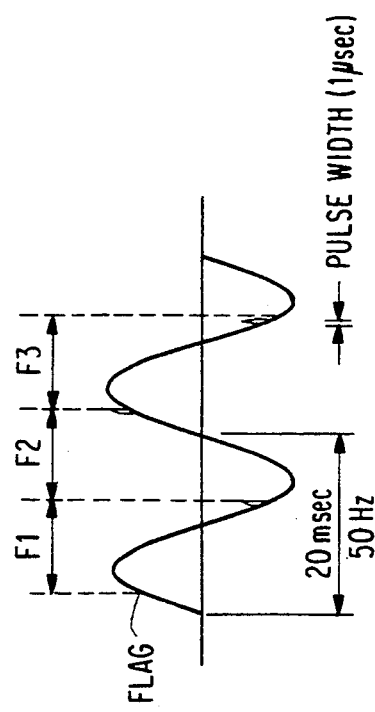
FIG. 19 is a waveform diagram for a power source noise and for a relativity to a continuous data frame timing (FIG. 18).

While the direct connection of transmission lines between the numerical control unit 1 and the remote control units 2 are shown in the first embodiment, the present invention is applicable to a case where there also is a machine I/O section acting as an interface to a drive system, such as servo amplifiers and spindle amplifiers. FIG. 9 is a structural configuration of an alternative embodiment of a numerical control system having a plurality of slave stations 2 and a master station 1 connected by a serial transmission line 4 for mutual data transmission. An operator unit 6, comprising a board 6A and display 6B, is connected to the master station and a plurality of directly controlled slave units 7, having driven elements 7A, and a controlled unit 8, having driven unit 8A, are also connected to the master station 1. An I/O interface 2A, having the same role as that of interface 59 in the conventional system illustrated in FIG. 17, also appears in the slave stations 2.

For example, as shown in FIG. 9, the machine output signal of the numerical control unit 1 may be entered into the machine I/O sections 2A of the remote control units 2 so that the CPUs of the remote control units may automatically determine the value of the timer time setting register 110 in FIG. 4 according to timing information on the entry of the signal.

Processing timing in accordance with the invention may be described specifically with reference to the timing diagram of FIG. 8 and the system illustrations in FIGS. 4 and 9. Referring to FIG. 8, the numerical control unit (master) 1, which ordinarily performs multitasking under a real-time operating system, responds to a system clock signal (designated by timing arrows along time-line A in FIG. 8), and repeats its execution within a 1-cycle area. Signals along time-lines B and F indicate the processings of the numerical control unit 1, wherein R1, R2 and R3 are the processings of receive data from the remote control units (slaves) 2, wherein S1, S2 and S3 are the processings of transmit data to the remote control units 2, wherein O1, O2 and O3 are the output processings of the numerical control unit 1, and wherein I1, I2 and I3 are the input processings thereof.

Signals along time-lines C and G indicate the processings of the remote control unit 2 which are preceded by R to differentiate from the those of the numerical control unit 1.

In FIG. 8, the processing signals of the conventional system are along time-lines B and C and those signals of the present invention are along time-lines F and G. In the conventional system, the output processing O1 and the input processing I1 of the numerical control unit 1 are performed after the transmit processing S1 from the numerical control unit 1 to the remote control unit 2. In response to the transmit processing S1 of the numerical control unit 1, the remote control unit 2 first perforths receive processing RR1, then output processing RO1 and input processing RI1. Due to this sequence, a time shift occurs between the output processing O1 of the numerical control unit 1 and the output processing RO1 of the remote control unit 2 and between the input processing I1 of the numerical control unit 1 and the input processing RI1 of the remote control unit 2. These shifts are seen in time-lines D and E of FIG. 8. Such time shifts present a problem since the coordinated operation of several devices cannot be obtained.

In the system according to the present invention, the receive processing RR1 of the remote control unit 2 also is performed in response to the transmit processing S1 of the numerical control unit 1. However, by contrast, a timer is started by a destination address (D.A.) detection signal detected at this time. The implementation of such timer may be in a manner disclosed with respect to FIG. 4. As seen in time-line H, after the timer has expired, the output processing RO1 and the input processing RI1 of the remote control unit 2 are performed at approximately the same time as the output processing O2 and the input processing I2 of the numerical control unit. This coordinated processing will increase the accuracy of I/O processing timing between the entire numerical control unit system and the machine interface 5 of the machine.

Since the I/O processing of the remote control unit 2 is delayed into the next cycle, while that in the conventional system is conducted in the same cycle, the response time from the input to the output is compared as follows:

In the conventional system, as illustrated on time-lines D and E:
RI1→RS1→R2→O2 (from remote control unit input to numerical control unit output)
I1→S2→RR2→RO2 (from numerical control unit input to remote control unit output).

In the present invention system, as illustrated by time-lines I and J:
RI1→RS2→R3→O3 (from remote control unit input to numerical control unit output)
I1→S1→RR1→RO1 (from numerical control unit input to remote control unit output).

Notwithstanding the introduction of a timed delay, in both systems, the response time is approximately 1 cycle and it can be seen that there is no difference between the two systems in this regard. However the timing accuracy is significantly improved. The length of the arrows in lines D, E, H and I are a schematic representation of the durations involved.

This selectable delay can assure coordination of several devices, in a manner previously explained with respect to FIG. 4. In that Figure, the CPU 105 in a slave station may store, in an interrupt timing setting register 110, a predetermined value which is preset so that input-/output processings of a tool machine in a numerical control unit (master station) and a remote control unit (slave station) can be synchronized. With reference to FIG. 8, lines F and G, this is the time required from receive processing RR1 on the side of the slave station 2 to output processing O2 on the side of the master station 1 (in case "0000" is set in system counter presetting register 106) or an equivalent time is preset in interrupt timing setting register 110 by CPU 105. In the case where value other than "0000", e.g., "0100", is set in system counter presetting register 106, "0100" is added to the time required from receive processing RR1 on the side of the slave station 2 to output processing O2 on the side of the master station 1.

However, the amount of time required from the beginning of receive processing RR1 on the side of a slave station 2 to the end of output processing O2 on the side of master station 1 may be changed depending upon various factors, such as the input/output characteristics of the interface section 2A of a machine tool.

Because of this, it is better to actually measure the time required from receive processing RR1 on the slave station 2 side to output processing O2 on the master station 1 side and to set the actually measured time in interrupt timing setting register 110 as a preset value.

Figure 10:
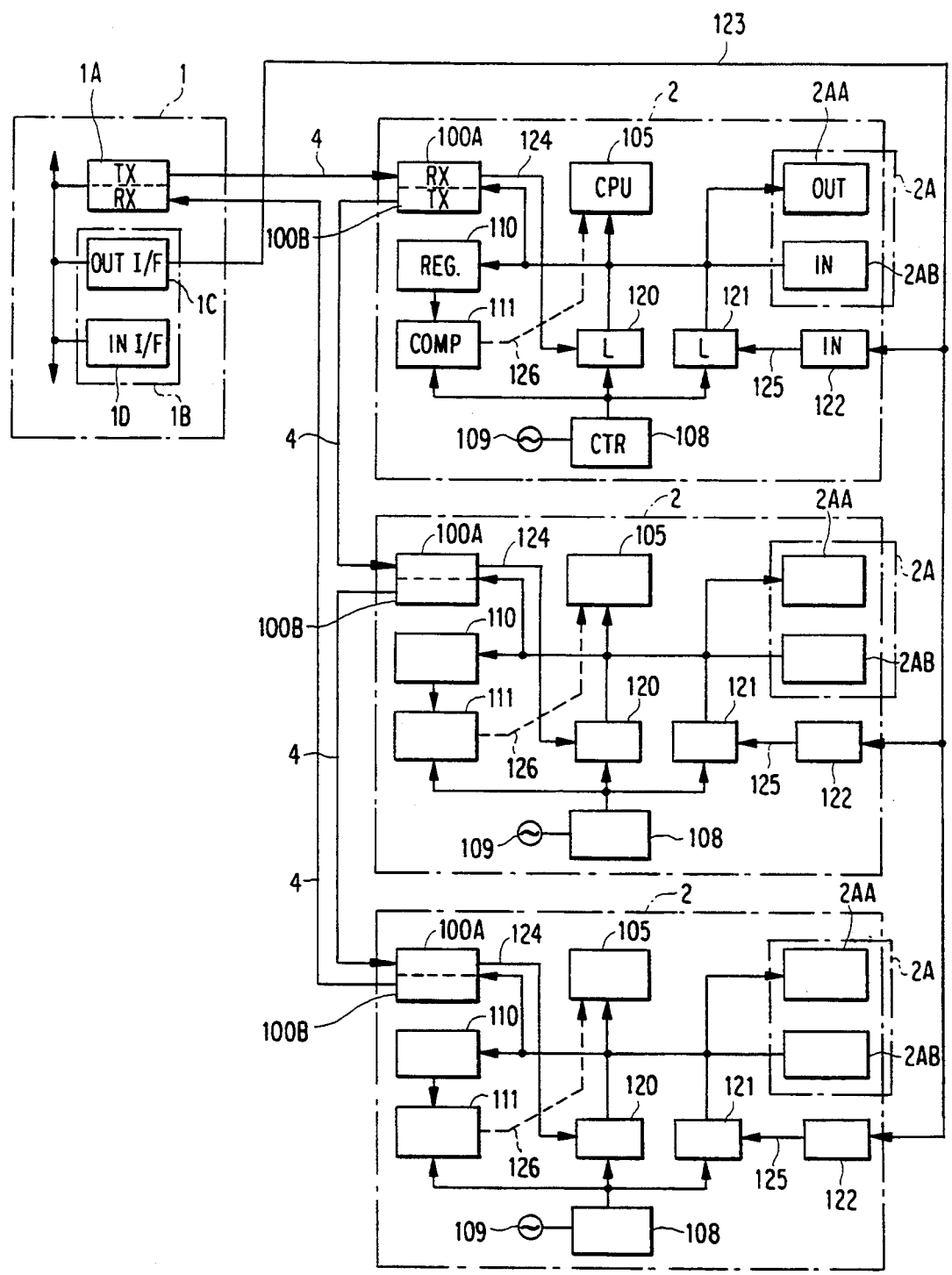
FIG. 10 illustrates details of the N/C system of FIG. 9.
Figure 11:
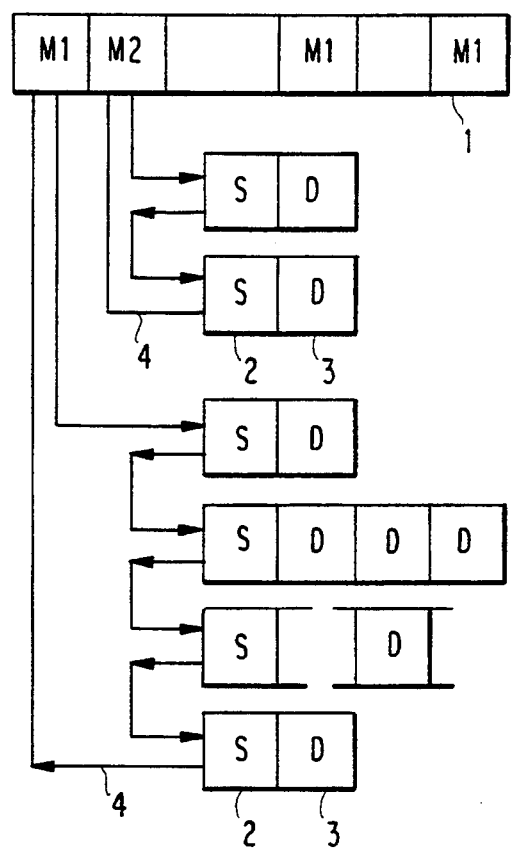
FIG. 11 illustrates a conventional system topology based on a serial real-time communication system (SERCOS).

FIG. 10 show examples of an embodiment when the time required from receive processing RR1 on the slave station 2 side to output processing O2 on the master station 1 side is measured and this actually measured time is set in the interrupt timing setting register 110. Specifically, FIG. 10 illustrates a detailed circuit diagram of an important section of FIG. 9. In this configuration, master station 1 includes a transmit/receive section 1A for a HDLC frame or similar frame on the N/C unit side. A machine section 1B in the N/C unit comprises machine output interface section 1C and machine input interface section 1D. Each of the slave stations 2 on the remote side includes a transmit/receive section 100 for the HDLC frame or a similar frame which corresponds to the combination of receiver 101, receive shift register 102, flag detector circuit 116, FCS calculation comparison circuit 117, serial/parallel converter circuit 118, receive RAM 103, transmit RAM 119 and receive address setting register 104 in FIG. 4. A first latch circuit 120 latches the contents of system counter 108 when a receive start signal to be output to the N/C unit is supplied. 121 is the second latch circuit which latches the contents of system counter 108 when a machine output signal from the N/C unit is input. 122 is a sensor input section which inputs a machine output signal from the N/C unit and outputs a sensor latch signal to the second latch circuit 121 when this signal is input. 123 is a machine output signal line. 124 is a receive start signal. 125 is a sensor latch signal. 126 is an interrupt signal. 2AA and 2AB are machine output and input sections of the remote control side. Other components are similar to those in the first embodiment and will not be described herein.

In operation data transmitted from transmission section 1A of the N/C unit will run through transmission line 4 and will be received at receive section 100A of the remote control unit. If an address section of the received data fordeat matches an address which is preset in the receive address setting register 104 by CPU 107, a receive start signal 124 will be output from the flag detector circuit 116.

The receive start signal 124 will be input in to system counter 108, which continually counts the number of signals based on the output of oscillator circuit 109, and the first latch circuit 120 will latch the contents of the system counter 108 at this time.

Next, when the N/C unit starts a machine output processing, a signal will be output to a machine output signal line 123 from a machine output section 1C. This signal will be input into the sensor input section 122 in the remote control unit and, just like the above case, the second latch circuit 121 will latch the contents of system counter 108 in response to sensor latch signal 125, which is output in response to the input signal.

CPU 105 of the remote control unit compares the contents of the first latch circuit 120 with those of the second latch circuit 121. If a difference is detected, it sets the output process timing directed to a remote machine output section 2AA of the remote control unit in the interrupt timing setting register 110 based on the difference. To be more precise, in case "0000" is set in the system counter presetting register 106, the time required from receive processing RR1 on the remoter control unit side to output processing O2 on the N/C unit side is set. When a value other than "0000", for example, "0100" is set in the system counter presetting register 106, "0100" is added to the time required from receive processing RR1 on the remote control side to the output processing O2 on the N/C side.

Operations after this are similar to those of other previously described embodiments and will not be repeated herein.

In this embodiment, there is an example in which a sensor input section 122 is specially provided in remote control unit. However, a similar operation can be appreciated when a remote machine input/output section 2A is utilized.

In the described embodiment, the timing for a machine output processing is based on a match between the N/C unit and the remote control unit. However, as would be apparent to one of ordinary skill in the relevant art, if the process timing difference between machine output and input processing on N/C unit side is known beforehand, it is possible to match a machine input processing both at the N/C unit and at the remote control unit. Further, it should be noted that the present invention is applicable not only to a communication system used with a numerical controller as described in the preferred embodiment, but also to a communication system for use with any other controller requiring synchronous control.

Figure 7A:
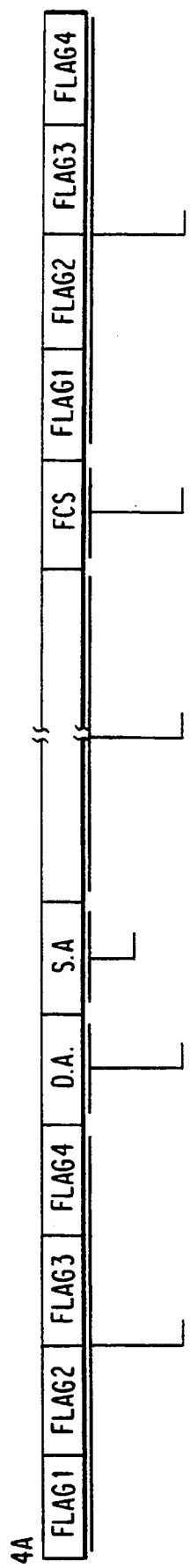
FIGS. 7A and 7B, respectively, illustrate an HDLC frame configuration of an embodiment of the present invention and a transmission sequence using the invention.
Figure 7B:
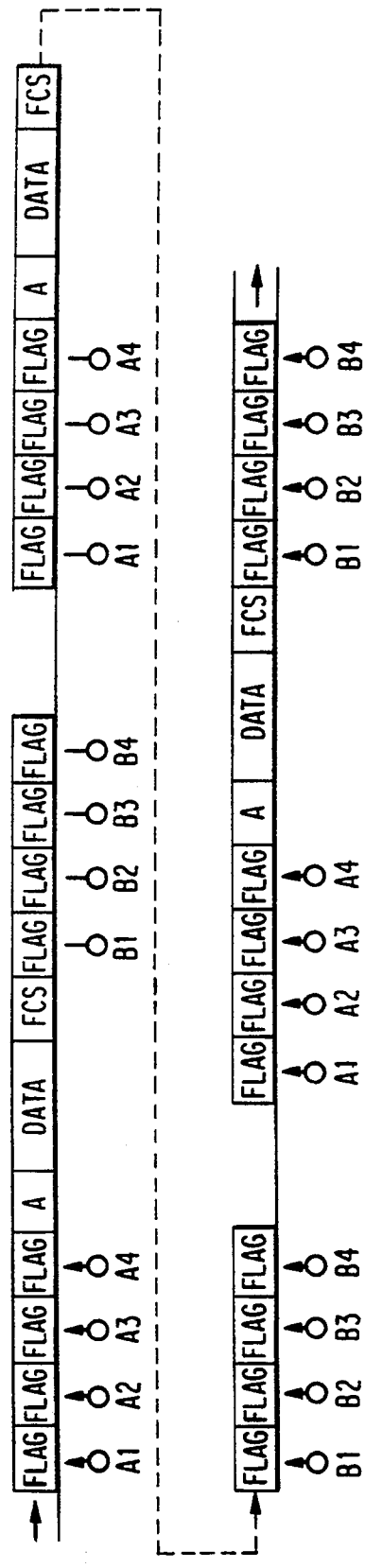

The third embodiment of the present invention, may be described in accordance with FIG. 7A and 7B. FIG. 7A shows the HDLC frame of the present invention system and FIG. 7B that of the conventional system.

The present invention system is characterized by its ability to have multiple start and end flags, the number being set by the flag number setting register 21 in FIG. 3. In addition, when the destination address (D.A.), also serving as a synchronization code, is detected on a receiving end, the system counter 108, illustrated in FIG. 4, is preset and started.

In the conventional system, only a single start flag and a single end flag are used. Hence, if either of these flags cannot be detected due to transmission line noise, etc., there is a strong possibility that the reception of the HDLC frame cannot be started or ended. In the system embodying the present invention, however, a plurality of start flags and end flags are provided to allow the reception of the HDLC frame to be started and ended if one or more flags are not detected, thereby reducing the possibility of a reception error. Further, if the start flag and end flag cannot be detected in the conventional system, a start of reception of the next HDLC frame is judged as an end of the reception of the preceding frame, thereby preventing restoration of the transmission cycle to normal. If there is such a possibility, the present invention system only results in receive error of a single frame, allowing restoration and ensuring a high degree of safety.

While the number of start flags and end flags provided in the preferred embodiment illustrated in FIG. 7A is the same, the number may be different.

If the structure of a transmission frame consists of a plurality of start flags and a plurality of end flags, transmission line noise is reduced and, as FIG. 7B shows, even if a flag at A1, A2, B1, B2 etc. cannot be detected, a start flag and an end flag can be detected without fail at A3, A4, B3, B4 etc. Also, if the number of flags is counted on the transmission side, once the transmission of a predetermined number of flags has been completed, the data transmission will be stopped. Therefore, the significant inconvenience of an inability to start or finish receiving a frame can be eliminated.

In addition, if the master station has a flag number setting register, the number of flags can be easily increased or decreased depending upon the relevant environment in which the system is used, e.g., the noisiness of a factory. That is, if a factory has a lot of noise which causes a transmission problem, the number of start and end flags can be increased to overcome this problem.

The entire disclosure of each and every foreign patent application from which the benefit of foreign priority has been claimed in the present application is incorporated herein by reference, as if fully set forth.

Although this invention has been described in at least one preferred form with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. A communications system comprising:
a master station, a plurality of slave stations each for performing a specified function and transmission line means, said master and slave stations being connected by said transmission line means in a loop or a daisy-chain for serial communication among said stations, said master station being operative to generate control data for each of said slave stations so that said master station controls the way each slave station performs its specified function and to addressably transmit said control data in predetermined ones of serial time slots for each respective slave station such that each slave station receives said control data in a predetermined time slot which is unique to that slave station, each said slave station being operative to addressably receive and respond to said data, and
synchronization means operative to control the transmission timing of addressable transmission of data in predetermined time slots and, in response to addressable reception of said data at each respective slave station, to delayably control the response timing of each such slave station to said data by a respective predetermined period of time,
whereby the response timing of all said slave stations to the addressable transmission of data by said master station is synchronized.

2. The communications system of claim 1 wherein said synchronization means comprises:
means at said master station for establishing a respective predetermined timing for transmission by said master station of data to each slave station,
means at each said slave station for identifying said respective predetermined timing and, in response to the addressable reception of said data, for using said predetermined timing to control the response timing of said slave station.

3. The communications system of claim 2 wherein said means for establishing comprises:
processor means for establishing and storing respective predetermined timing information for serial transmission of said data to each station, said predetermined timing information defining a plurality of said serial time slots, and
transmission means responsive to said stored predetermined timing information for controlling the transmission timing of data for said slave stations within said time slots.

4. The communications system of claim 3 wherein said transmission means at said master station comprises a source of clock pulses, a counter of said clock pulses and a comparator for comparing the value of the count of said counter and said stored predetermined timing information, said comparator identifying a transmit time for transmitting data to each of said slave stations.

5. The communications system of claim 2 wherein said means for identifying and using comprises:
processor means for establishing and storing respective predetermined timing information for each said slave station, said predetermined timing information identifying a timing corresponding to said predetermined timing for transmitting said data to each slave station, and
interrupt means responsive to said stored predetermined timing information and the addressable reception of data for generating an interrupt signal.

6. The communications system of claim 5 wherein said interrupt means at each said slave station comprises a source of clock pulses, a counter of said clock pulses and a comparator for comparing the value of the count of said counter and said stored predetermined timing information, said comparator identifying an interrupt timing for each said slave station.

7. The communications system of claim 6 wherein said master and slave stations each have a source of clock pulses that operates at the same frequencies.

8. The communications system of claim 6 wherein at least two of said master and slave stations have a source of clock pulses that operate at different frequencies.

9. The communications system of claim 2 further comprising an address detection means at each slave station, said detection means being operative to store unique address information identifying said slave station, to detect address information in said data transmitted by said master station and to generate a time slot signal in response to the identity between said stored and transmitted address information.

10. The communications system of claim 9 wherein each said slave station comprises a timer for controlling the generation of an interrupt signal, said timer being responsive to said time slot signal and to said predetermined timing to preset said timer on receipt of said data so that said timers of all said slave stations are put in synchronization with each other on termination of the receipt of said data by all said slave stations.

11. The communications system of claim 10 wherein the slave stations are operative to preset their timers again only a predetermined period of time after they have been first preset.

12. A method of synchronizing the operation of a communications system comprising a master station and a plurality of slave stations each slave station for performing a specified function, said stations being connected in a loop by a serial transmission line and being operative to communicate along said loop at predetermined times, comprising;
establishing at said master station a plurality of serially positioned time slots, each of said time slots being uniquely allocated to a corresponding slave station for transmission of control data from said master station to said slave station and having a corresponding duration, each said data comprising address information uniquely identifying said slave station so that said master station controls the way each slave station performs its specified function;
establishing at each slave station respective predetermined timing information, said timing information being established on the basis of the relative position of the time slot allocated to said slave station;
transmitting said plurality of data in said corresponding plurality of time slots from said master station to said slave stations;
detecting said address information at each said corresponding slave station and generating a detection signal;
counting at each slave station from a preset value dependent on the position of the time slot for each station and in response to said detection signal; and
generating at each station an interrupt signal in response to a predetermined count value, a plurality of said slave stations generating an interrupt in response to said count value.

13. The method of claim 12 further comprising delaying a second performance of said counting step for a predetermined period of time after completion of a first performance of said counting step.

14. A method of synchronizing the operation of a communications system comprising a master station and a plurality of slave stations, each slave station for performing a specified function and said master station controlling the slave stations' performance of their specified functions, said stations being connected in a loop by a serial transmission line and being operative to communicate along said loop at predetermined times, comprising:
serially transmitting from said master station at a plurality of predetermined time intervals to corresponding slave stations data comprising address information uniquely identifying each said slave station, each predetermined time interval uniquely corresponding to one slave station;
setting predetermined timing information at each said slave station, said predetermined timing information being established on the basis of said predetermined time intervals allocated to said slave station;
detecting said address information at said corresponding slave station; and
based on said detecting step and said predetermined timing information set at each slave station, delayably generating a control signal, said predetermined timing information being set so that a plurality of said slave stations generate said control signal at predetermined timings.

15. The method of claim 14 wherein said predetermined relative timings comprise the concurrent generation of interrupts by at least two slave stations.

16. The communications system of claim 1 wherein said master station is operative to provide a machine output signal to a first plurality of said slave stations, each said first plurality of slave stations further comprising machine input/output interface means and machine output signal detecting means, said machine output signal detecting means being operative to establish an output process timing at said master station with respect to a receive processing timing at said first plurality of slave stations.

17. The communications system of claim 1 wherein said master station transmits information to and receives information from slave stations on a cycle basis and performs input and output processing in one cycle at substantially the same time that input and output processing at said slave stations for information from a previous cycle is conducted.

18. The communications system of claim 1 wherein said slave stations are operative to automatically determine the value of said predetermined times on the basis of machine output signals transmitted by said master station.

19. The communications system of claim 16 wherein said machine output signal detecting means further comprises a storage means at each said slave stations responsive to a receive start signal and a machine output processing signal from said master station for latching first and second current count values for each said slave station.

20. The communications system of claim 19 wherein said machine output signal detecting means further comprises means for comparing said first and second current count values and sets an output process timing on the basis of said difference.

21. The synchronizing method of claim 14 wherein said predetermined timing information is preset.

22. The synchronizing method of claim 21 further comprising measuring the time required from receive processing at a slave station to output processing at the master station and using the actually measured time as said predetermined timing information.

23. The synchronizing method of claim 21 wherein said predetermined timing information delays the performance of input and output processing for one cycle at a slave station with respect to the performance of receive and transmit processing for said same cycle.

24. A communications system comprising a master control unit and a plurality of remote control units, each remote control unit for performing a specified function and said master control unit controlling each remote control unit in the performance of its specified function, wherein serial data communication is conducted using HDLC-type protocols, between the master control unit and the remote control units, wherein said remote control units detect the destination address of an HDLC-type frame transmitted from the master control unit, check it against stored destination address information, receive it on a match, and transfer data in synchronization with the data transfer of the master control unit on the basis of the time when said destination address was detected,
  wherein said master control unit comprises a serial data transmission means for transmitting a plurality of start flags and end flags for at least one of said HDLC-type frames.

25. A communication system comprising a master control unit and a plurality of remote control units, each remote control unit for performing a specified function and said master control unit controlling each remote control unit in the performance of its specified function, wherein serial data communication is conducted, using HDLC-type protocols, between the master control unit and the remote control units, wherein said remote control units detect the destination address of an HDLC-type frame transmitted from the master control unit, check it against stored destination address information, receive it on a match, and transfer data in synchronization with the data transfer of the master control unit on the basis of the time when said destination address was detected,
  wherein said master control unit comprises a serial data transmission means for transmitting a plurality of start flags and end flags for at least one of said HDLC-type frames, and
  wherein said serial data transmission means comprises means for selectively setting a number of start and end flags in said plurality.

26. A method for a communication system comprising a master control unit and a plurality of remote control units, each remote control unit for performing a specified function and said master control unit controlling each remote control unit in the performance of its specified function, wherein serial data communication is made under HDLC-type protocols between the master control unit and the remote control units, the method of communication comprising:
  transmitting an HDLC-type frame from said master unit to said remote control units, said frame comprising a destination address uniquely identifying a corresponding one of said plurality of remote control units and at least one of a plurality of start flags and a plurality of end flags defining said HDLC-type frame from said master unit to said remote control units, said frame comprising a destination address uniquely identifying a corresponding one of said plurality of remote control units and at least one of a plurality of start flags and a plurality of end flags defining said HDLC-type frame,
  detecting at said remote control units, at least on the basis of said transmitted flags, said destination address in an HDLC-type frame transmitted from said master control unit,
  checking at said remote control units said destination address against a stored destination address in order to determine a match therebetween,
  receiving said HDLC-type frame on a match of said destination address, and
  transferring data from at least one remote control unit in synchronization with the data transfer of the master control unit on the basis of the time when said destination address for such remote control unit was detected,
  further comprising the step of selecting the number of start flags and/or end flags for use in said HDLC-type frame.

* * * * *